United States Patent [19]
Hirsch

[15] 3,736,551
[45] May 29, 1973

[54] SWIMMERS TACTILE COMMAND NAVIGATION APPARATUS

[75] Inventor: Joseph Hirsch, Santa Ana, Calif.

[73] Assignee: The United States of America as represented by the Secretary of the Navy

[22] Filed: Nov. 16, 1970

[21] Appl. No.: 89,921

[52] U.S. Cl..................340/5 R, 340/5 T, 340/6 R, 340/16 C
[51] Int. Cl............................................H04b 11/00
[58] Field of Search.............340/5 R, 5 T, 6 R, 16 C; 343/7 ED

[56] References Cited

UNITED STATES PATENTS

| | | | |
|---|---|---|---|
| 3,337,839 | 8/1967 | Nelkin | 340/1 R |
| 3,181,116 | 4/1965 | Gordon | 340/5 T |
| 3,427,554 | 2/1969 | Lagoe et al. | 340/5 R |

Primary Examiner—Richard A. Farley
Attorney—Richard S. Sciascia and Ervin F. Johnston

[57] ABSTRACT

A command navigation apparatus including a back pad; a plurality of tactile indicators mounted in the back pad for providing tactile sensory indicators on the back, the tactile indicators being arranged in a pair of rows which are substantially perpendicular with respect to one another; and means for mounting the pad on a person's back so that one row of tactile indicators extends longitudinal and the other row of tactile indicators extends transverse the back. Upon sequentially energizing the tactile indicators in selected rows the person receives command indications to progress in various directions.

8 Claims, 9 Drawing Figures

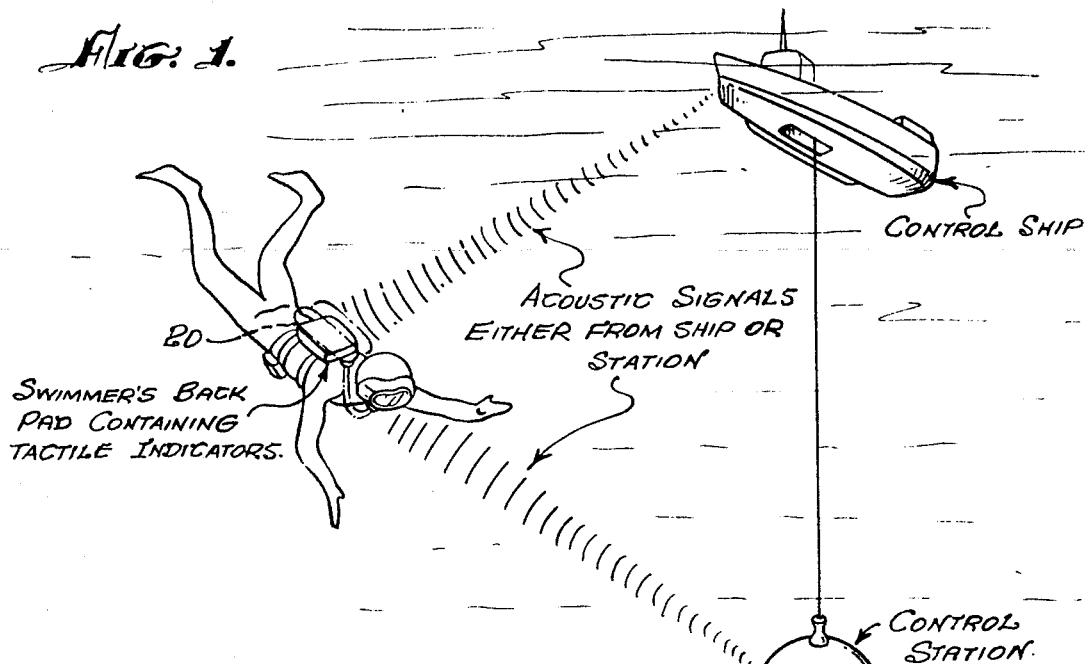
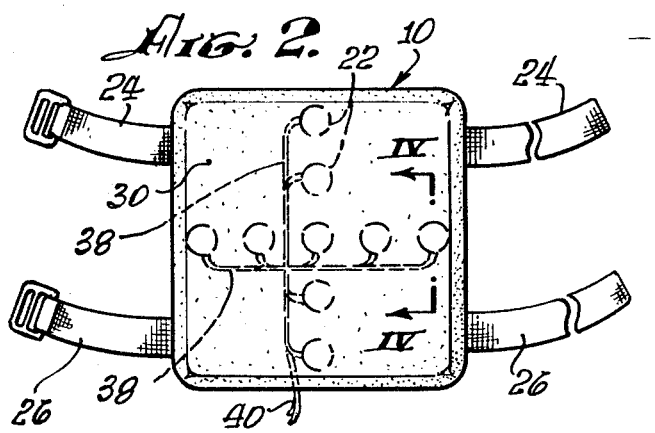
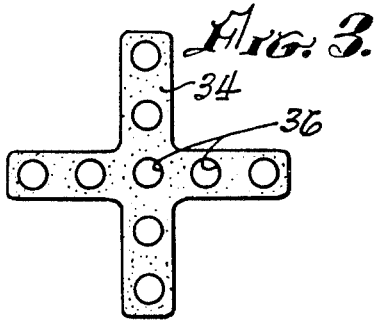
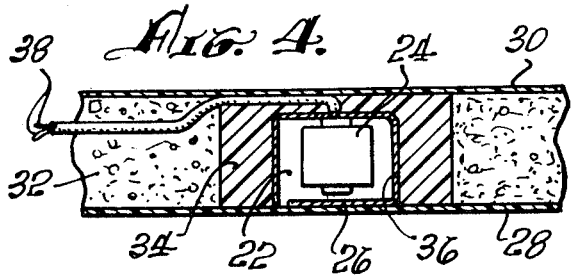

INVENTOR.
JOSEPH HIRSCH,
By ERVIN F. JOHNSTON,
Attorney.

SWIMMERS TACTILE COMMAND NAVIGATION APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Man is becoming more and more intrigued with the vastness of the resources of the continental shelves. In order to recover these treasures he has been placing considerable emphasis on upgrading the equipment of divers so that the diver's work can be more efficient and his time can be extended at a work location. The Navy, in their Sea Lab projects, has demonstrated that man can become accustomed to working for long periods of time in a deep water environment. Various programs have provided tools which can be easily used to perform underwater operations, and closed circuit breathing devices have been provided to extend the diver's time at the work location. While there has been notable developments in these fields there has been no success in developing hardware which would enable communication between a remote station and the diver. When a diver is working in murky or deep water environments it is often necessary to communicate with the diver so that he can be guided to a work location or back to his underwater habitat or surface station.

The difficulty of communicating with a diver who is breathing a helium-oxygen mixture has been apparent for some time. The difficulty arises primarily from the fact that the increased velocity of sound in this medium causes the cavities of the nose and throat to resonate at higher frequencies, thus giving many of the speech sounds a "squeaky" effect. In order to improve the intelligibility of speech in a high helium content atmosphere a speech unscrambler has been proposed. Another communication system which has been proposed is an electro writer. The latter system requires a wire between the transmitting station and the diver. Both of these systems are unacceptable for future man in the sea operations where communications must be fast, and intelligible.

SUMMARY OF THE INVENTION

The present invention is an apparatus which impresses sequential tactile sensations on the diver's body to indicate to him various directions in which he is to travel. The invention is in the broad field of communicating through the sense of touch, in which there has already been some hardware developed for other purposes. In U.S. Pat. No. 2,972,140 to Hirsch there is disclosed a basic system of communication which uses coded vibratory tactile stimuli. In that system five buttons are utilized by the five fingers of a "speaker" to transmit tactile stimuli to the five fingers of a "listener" which are resting on a corresponding set of five sensitive vibration receiving diaphragms. In U.S. Pat. No. 3,157,853 to Hirsch the basic concept of the aforementioned patent was extended to communicating aircraft data to a pilot by tactile sensations. In U.S. Pat. No. 3,246,323 to Hirsch tactile sensations were utilized for warning the pilot of an impending collision. In U.S. Pat. No. 3,497,668 to Hirsch the concept was utilized for indicating to a machinist the pressure of his tool on a piece of work.

The present invention differs from the aforementioned patents in that tactile sensations are utilized to indicate command directions to a swimmer or diver. In the preferred embodiment a back pad is utilized and a plurality of tactile indicators are mounted in the back pad for providing tactile sensory indications on the diver's back. The tactile indicators are arranged in a pair of rows which are substantially perpendicular with respect to one another. When the pad is mounted on the diver's back one row of indicators extends longitudinal and the other row of indicators extends transverse his back. A remote station then transmits signals which sequentially energize the indicators in selected rows so that the diver receives command indications to progress in various directions. In a water environment acoustic signals would be utilized for transmitting command signals between the remote station and the diver. While the invention is particularly useful for communicating with a diver it also has use for communicating with a person working on land.

STATEMENT OF THE OBJECT OF INVENTION

An object of the present invention is to provide a tactile command navigation apparatus.

Another object is to provide a highly reliable command navigation apparatus for swimmers and divers.

A further object is to provide an underwater tactile command navigation apparatus which is simple in construction, fast, and highly reliable.

Other objects and many of the attendant advantages of this invention will be readily appreciated as it becomes better understood by reference to the description and accompanying drawings which follow.

BRIEF DESCRIPTION OF THE DRAWINGS

FIG. 1 is an underwater illustration of a surface vessel and submerged station communicating with a diver;

FIG. 2 is a plan view of an exemplary embodiment of a back pad with the tactile indicators shown in phantom;

FIG. 3 is a plan view of an insert for retaining the tactile indicators within the back pad;

FIG. 4 is a view taken along plane V—V of FIG. 2;

DESCRIPTION OF THE PREFERRED EMBODIMENTS

Figure 5:
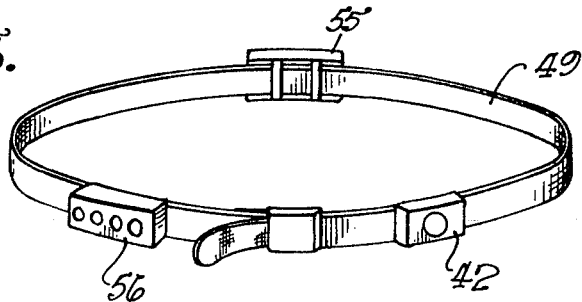
FIG. 5 is an isometric view of a diver's belt with transmitter control, transmitter, and receiver units attached thereto.

Referring now to the drawings wherein like reference numerals designate like or similar parts throughout the several views there is shown in FIG. 1 a diver which is being directed by command signals from either a surface vessel or a submerged station. The diver is wearing a back pad 20 which has a plurality of tactile indicators which may be transducers 22 (see FIGS. 2 and 4) for providing sensory indications of direction on the back of the diver in response to acoustic signals transmitted from the remote station. The back pad 20 may be mounted directly on the diver's back underneath a wet suit.

As illustrated in FIG. 2 the tactile transducers 22 are arranged in a pair of rows which are substantially perpendicular with respect to one another. In the preferred embodiment of this invention these rows are arranged so that one row extends longitudinal and the other row extends transverse to the diver's back when the back pad is mounted as illustrated in FIG. 1. The means for mounting the pad in such a position may include top and bottom pairs of straps 24 and 26 which extend around the chest and abdomen respectively of the diver and are buckled together in front of the diver.

As illustrated in FIG. 5 the back pad may include front and back compliant cover sheets 28 and 30 which are stitched around their edges and filled with a resilient padding 32, such as sponge rubber. The front and back sheets 28 and 30 of the back pad may be of any suitable compliant material such as sheet rubber or sheet plastic. Interposed within the back pad 10 is a retainer 34 (see FIG. 3) for receiving the tactile transducers 22 and retaining them in perpendicular rows. The retainer 24 may be a soft compliant molded member, such as plastic or rubber, which is provided with a series of holes 36 on its front side for receiving the individual transducers 22. The tactile transducers 22 may be of the vibratory type in which a small vibrator is mounted within a cylindrical casing. The vibrator includes an electromagnet 24 which pulsates a diaphragm 26 which is located immediately adjacent the front compliant sheet 28. The diaphragm 26 may be simply the top of the cylindrical casing, and the compliant sheet 28 should be thin (in the order of one thirty-second of an inch) to enable positive transmission of the signals to the diver's back.

The overall dimensions of the back pad may be in the order of 10 inches by 10 inches and should be constructed of materials which are sufficiently compliant so that the back pad will conform to any curvature of the diver's back. In this manner the tactile transducers 22 will each press against the diver's back so that he can sense the discrete pulsations transmitted through the compliant sheet 28. It should be understood that a vibrating type tactile transducer is only illustrative and that in lieu thereof a tactile indicator could be employed which utilized small electrodes which extend through the compliant sheet 28 and make direct contact with the diver's back. With such an arrangement the diver would sense small electrical signals rather than pulsations for communication purposes.

As illustrated in FIGS. 2 and 4 a pair of electrical wires 38 may extend from the electromagnet of each tactile transducer 22. These pairs of wires 38 may join together in a cord 40 which sealably extends through a bottom of the pad, as illustrated in FIG. 2. These wires transmit alternating current or pulsating direct current from a diver's receiver unit 42 which will be described in more detail hereinbelow.

In order to provide command directions to the diver, acoustic signals are transmitted from a remote station to sequentially energize the longitudinal and transverse rows of transducers 22 in the diver's back pad.

Figure 8:
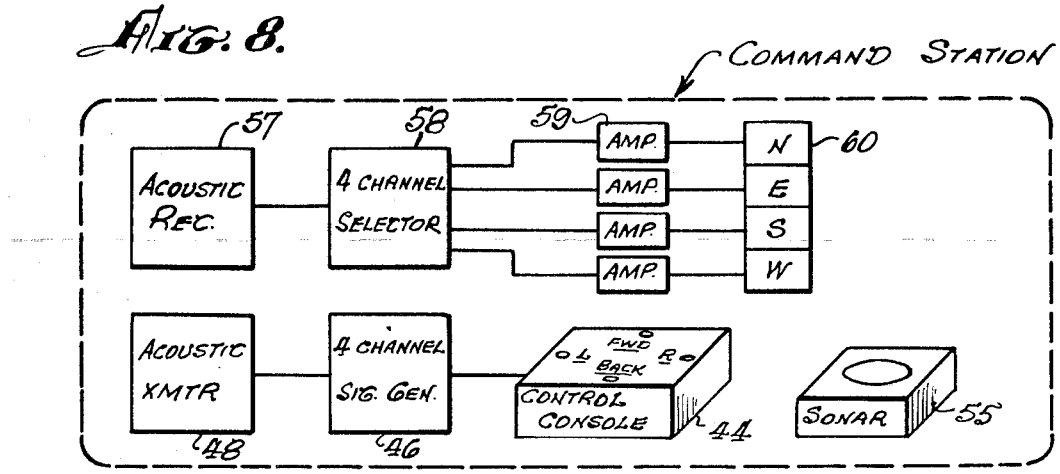
FIG. 8 is a schematic illustration of the hardware which may be utilized at a command center for transmitting command signals to the diver.
Figure 9:
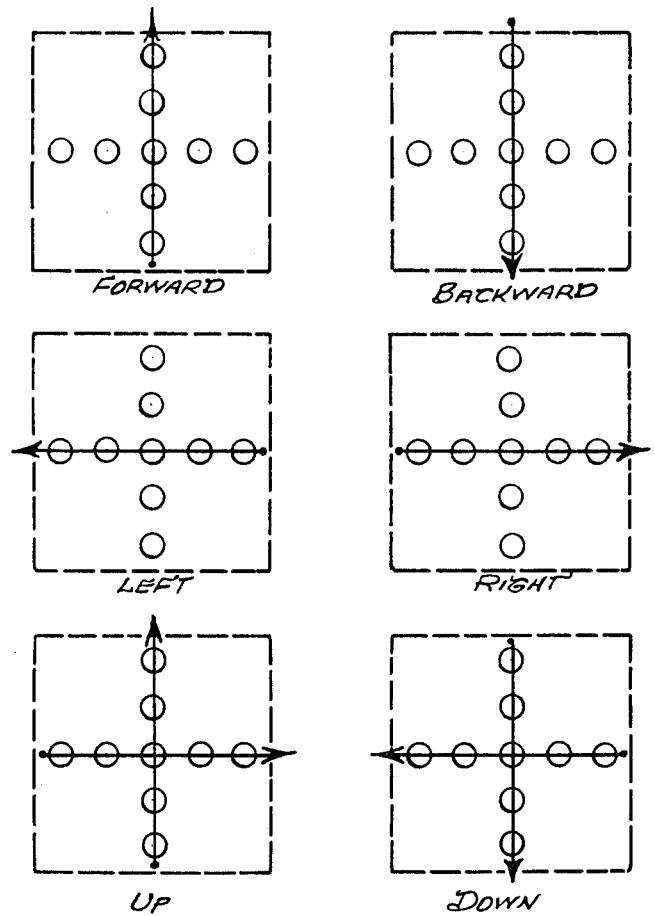
FIG. 9 are schematic illustrations of the various modes of operation of the tactile indicators in the diver's back pad.

FIG. 8 is schematic illustration of the electronic components which may be located at a surface or underwater remote station. This station may have a finger operated control console 44. The control console 44 may have four push push buttons (forward, back, right, and left) which transmit representative signals to a four-channel signal generator 46. Each channel of the signal generator 46 generates a signal which causes a transmitter 48 to transmit an acoustic signal of a particular frequency to the diver's receiver unit 42. The receiver unit 42, which will be described in more detail hereinbelow, produces a train of signals (five signals for a row of five transducers) which causes the transducers in a row to sequentially operate and apply a traveling sensory action on the diver's back. For the arrangement of transducers illustrated in FIG. 2 an interval between signals in a train of about one-fourth of a second would be satisfactory. When the transducers are sequentially energized the diver will sense forward, backward, left, or right sensory indications, as illustrated in FIG. 9. If it is desired that the diver progress in an upward direction the forward and right buttons of the control console 44 may be consecutively pushed and if the diver is to progress downwardly the back and left button may be consecutively pushed. In this manner, the diver may be command directed to any location within his three dimensional environment.

Figure 6:
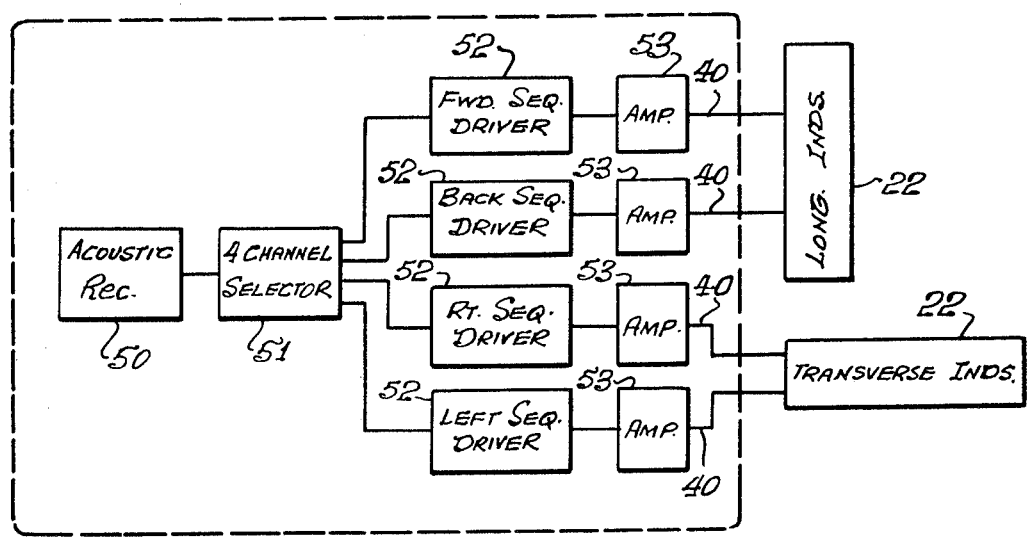
FIG. 6 is a schematic illustration of the circuitry of the receiver unit on the diver's belt.

The acoustic signals transmitted by the transmitter 48 at the command station are received by the receiver unit 42 on the diver. As illustrated in FIG. 5, this receiver unit may be conveniently mounted upon a diver's belt 49. As shown in FIG. 6, the receiver unit includes a receiver 50 which is capable of receiving the acoustic signals of four various frequencies from the command station. The receiver 50 is connected to a channel selector 51 which divides the four signals for proper energization of respective sequential drivers 52 (forward, back, right, and left). Each sequential driver 52 puts out a train of signals, which may have one-fourth second intervals, which are amplified by a respective amplifier 53. The amplified signals are fed to the appropriate row of transducers 22 for sequentially energizing the transducers in the row in a particular direction. If the amplified signals are D.C. this will cause a single push-pull movement of the diaphragm 26 within the transducer, or if electrodes are used a single electrical impulse would be applied to the diver's back. If multiple pulsations or electrode indications are desired by each transducer the sequential drivers 52 may be adapted to transmit A.C. or bursts of D.C. signals sequentially to the transducers in the appropriate row. In order to provide power to actuate the transducers 22 a battery pack 53 may be mounted on the back of the diver's belt 49. The battery pack 54 also contains an acoustic transmitter which will be described in detail hereinbelow.

Figure 7:
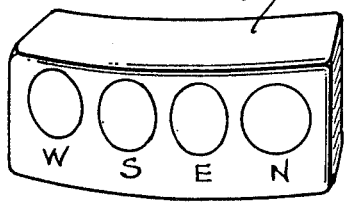
FIG. 7 is an enlarged isometric view of the diver's transmitter control unit which is mounted on the belt.

In order that an operator at the control station can direct the diver to various work locations as well as back to his habitat it is necessary that the diver's position as well as his present heading be known. As illustrated in FIG. 8, a sonar console 55 may be provided for indicating to the control operator the present location of the diver. Information of the heading of the diver must come from the diver himself. This may be accomplished by an acoustic transmitter control unit 56 which is mounted on the diver's belt 49. As illustrated in FIG. 7 this control unit may have four push buttons which represent North, East, South, and West. In the same manner as the control console 44, the four push buttons of the transmitter control unit 56 may be connected to a four-channel signal generator (not shown) which in turn is connected to a transmitter unit 55 (also battery pack) on the belt 49 for transmitting acoustic signals of four different frequencies to the command station. At the command station there is located an acoustic receiver 57 which is connected to a four-channel selector 58. The four-channel selector 58 may in turn be connected through amplifiers 59 to an azimuth console 60 which may have four indicating lights marked North, East, South, and West. When the diver pushes the buttons on the transmitter command unit 56 the corresponding indicators will light up at the console 60. If the diver desires to indicate a Northeast direction he may simply consecutively push the North and then the East buttons. The same would hold true for the directions Southeast, Southwest, and Northwest. From this panel the control operator will know if the diver is progressing in the wrong direction and he can then operate the control console 44 to redirect the diver until he assumes the proper direction. In this evolution the diver will utilize a compass to first know his direction, after which he will transmit this information to the control station. The sonar console 52 will provide information to the control operator whether to direct the diver upwardly or downwardly. The diver can also utilize the command transmitter 56 for transmitting a coded combination to the command station in acknowledgement of received commands.

It is readily apparent that the present invention provides a highly reliable command navigation system for a diver. With such an arrangement the diver can be directed to various work locations in murky or deep water, or he can be safely brought back to his habitat whether it be a surface ship or underwater station.

Obviously many modifications and variations of the present invention are possible in the light of the above teachings. It is therefore to be understood that within the scope of the appended claims the invention may be practiced otherwise than as specifically described.

I claim:

1. A command navigational device comprising:
   a back pad;
   a plurality of tactile indicators mounted in said back pad for providing tactile sensory indications on the back;
   said tactile indicators being arranged in a pair of rows which are substantially perpendicular with respect to one another;
   means for mounting the pad on a person's back so that one row of tactile indicators extends longitudinal and the other row of tactile indicators extends transverse the back; and
   means located at a remote station from the person for transmitting signals which sequentially energize the longitudinal and transverse rows of tactile indicators;
   whereby upon sequentially energizing the tactile indicators in selected rows the person receives command indications to progress in various directions.

2. A command navigational device as claimed in claim 1 wherein:
   the remote transmitting means transmits signals which sequentially energize the longitudinal row of tactile indicators selectively in a forward or aft direction and/or sequentially energize the transverse row of tactile indicators selectively in a right or left direction.

3. A command navigational device as claimed in claim 2 wherein:
   the signals transmitted from the remote station are acoustic signals so that the navigational device is effective for navigating a swimmer.

4. A command navigational device as claimed in claim 3 wherein:
   the tactile indicators are energized directly by the acoustic signals.

5. A command navigational device as claimed in claim 3 including:
   the tactile indicators being transducers, each transducer having a small electro-mechanical vibrator; and
   means mountable on the person for receiving the acoustic signals and sequentially electrically energizing the transducers.

6. A command navigational device as claimed in claim 5 including:
   means mountable on the swimmer for transmitting acoustic signals which indicate sectors of heading of the swimmer.

7. A method of navigating a swimmer comprising the steps of:
   providing sequential tactile indications along the swimmer's back in a forward direction for indicating move ahead and in a rearward direction for indicating move back; and providing sequential tactile indications across the swimmer's back in a right direction for indicating move right and in a left direction for indicating move left.

8. A method of navigating a swimmer as claimed in claim 7:
   providing simultaneous sequential tactile indications along and across the swimmer's back in selected directions for indicating up and down commands.

* * * * *